United States Patent [19]

Kabat

[11] Patent Number: 4,986,503
[45] Date of Patent: Jan. 22, 1991

[54] MOUNTING DEVICE

[76] Inventor: Thomas W. Kabat, 7856 Reinbold Rd., Reese, Mich. 48757

[21] Appl. No.: 276,342

[22] Filed: Nov. 25, 1988

[51] Int. Cl.⁵ .............................................. F16M 11/14
[52] U.S. Cl. .................................... 248/181; 248/288.5
[58] Field of Search ...................... 248/179, 181, 288.5, 248/288.3

[56] References Cited

U.S. PATENT DOCUMENTS

| 1,402,685 | 1/1922 | Timberlake | 248/231.2 X |
| 2,145,584 | 1/1939 | Chamberlain Jr. | 248/179 |
| 3,737,130 | 6/1973 | Shiraishi | 248/181 |
| 4,763,151 | 8/1988 | Klinger | 248/179 |

FOREIGN PATENT DOCUMENTS 531353  1/1922  France ................................ 248/181

Primary Examiner—Blair M. Johnson
Attorney, Agent, or Firm—Learman & McCulloch

[57] ABSTRACT

A mounting device for removably supporting an instrument or other article on a supporting member comprises an attaching member for attachment to the instrument, a support member for removably accommodating the attaching member, and a releasable latch for separably coupling such members to one another.

27 Claims, 2 Drawing Sheets

MOUNTING DEVICE

BACKGROUND OF THE INVENTION

Operators of boats and larger vessels conventionally mount instruments such as depth finders, lorans, radar scopes, radio transceivers, and similar devices on some portion of the boat such as a cowling. In most instances, the upper surface of the cowling is not horizontal, but slopes from the center of the boat toward its opposite sides. For many purposes it is undesirable to mount an instrument or other device in any position other than horizontal. Accordingly, the prior art contains many examples of mounting devices which are designed to enable an instrument or other device to occupy a horizontal position even though the surface on which it is mounted is not horizontal. In most instances, however, the known prior art devices are difficult to adjust, have an extremely limited range of adjustment, or both.

Some boats are constructed in a manner which offers little, if any, deterrent to theft of instruments and devices of the kind referred to above. Some of the mounting devices therefor contemplate removal of the mounting device from the boat when the latter is left unattended, whereas other mounting devices are constructed in such manner that the device itself may be separated from its mounting structure. In either case, the removal and replacement of the instrument or the like from known mounting devices are time consuming, often difficult, tedious, and require the use of tools.

An object of the present invention is to provide a mounting device for instruments and the like which overcomes the problems and deficiencies referred to above.

SUMMARY OF THE INVENTION

A mounting device constructed in accordance with the invention comprises an attaching plate which is adapted for attachment to the instrument or other article that is to be mounted on a boat or the like. The attaching plate preferably is secured permanently to the instrument and is adapted for removable coupling to a support.

In one embodiment the support enables the attaching plate and an instrument fixed thereto to be swiveled through 360° and rocked through a wide range of adjustment so as to permit the instrument to assume a horizontal position even though the structure on which the support is mounted may be inclined to the horizontal.

In another embodiment the attaching plate and instrument supported thereby are not tiltable or rockable, but are swivelable through 360°.

In a further embodiment the attaching plate and instrument supported thereby are neither tiltable nor swivelable.

In all of the embodiments the attaching plate and device supported thereby are easily separable from and returnable to the support without requiring the use of any tools. This objective is obtained by the provision of cooperable interlocking slides and slideways on the attaching plate and support and releaseable latch means reacting between the attaching plate and the support for releasably maintaining the plate and the support in assembled relation.

The latch means includes a pair of levers carried by the support or the attaching plate and which are swingable toward and away from abutments carried by the other of the attaching plate or support. The confronting surfaces of the levers and the abutments have engageable serrations or teeth and the levers are biased in directions to cause the teeth to mesh. The biasing means are yieldable, however, thereby enabling the levers to be moved in a direction to disengage the teeth, whereupon the attaching plate and the instruments supported thereby may be removed from the support.

In a preferred embodiment resilient means carried by the retaining levers reacts with the attaching plate and urges the latter in a direction to effect snug engagement of the meshed teeth, thereby eliminating any looseness or backlash when the retaining plate and the support are in assembled relation.

THE DRAWINGS

THE PREFERRED EMBODIMENT

Figure 1:
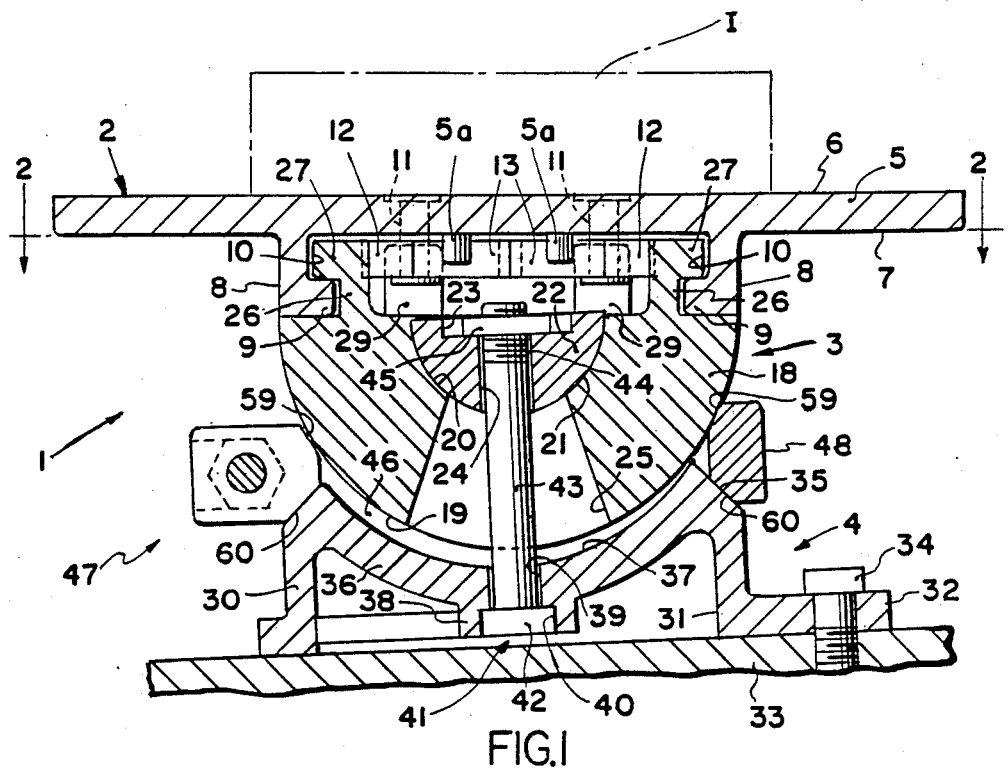
FIG. 1 is a vertical sectional view of a mounting device constructed in accordance with one embodiment of the invention.
Figure 2:
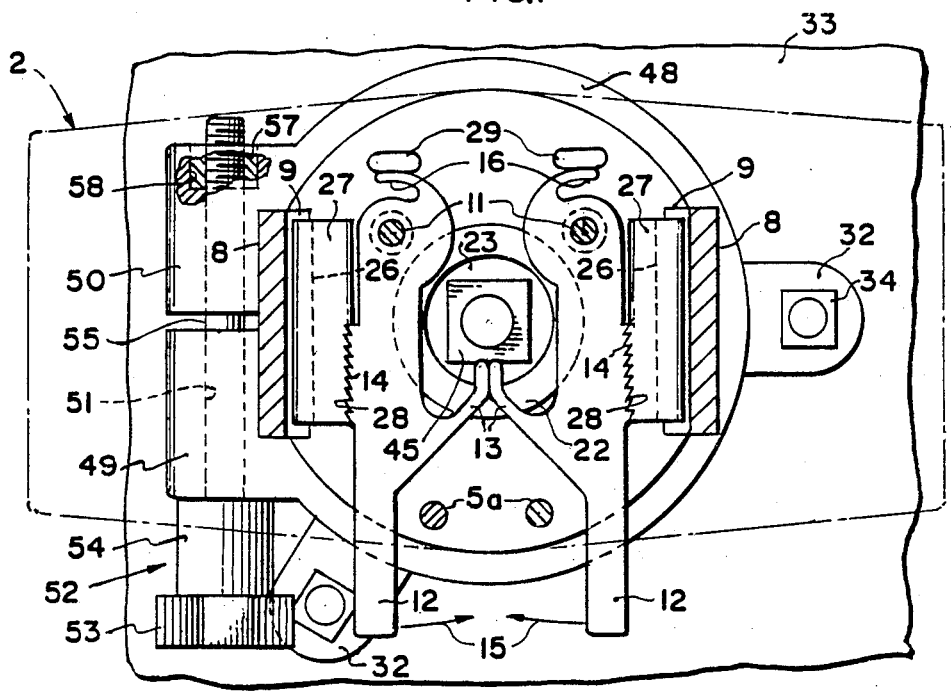
FIG. 2 is a sectional view taken on the line 2—2 of FIG. 1.

A mounting device constructed in accordance with the embodiment shown in FIGS. 1 and 2 is designated generally by the reference character 1 and comprises an attaching plate 2, a support 3, and a base 4. Each of the members 2-4 preferably is molded from a suitable plastic material such as nylon, but other materials may be used if desired.

The attaching plate 2 comprises an elongate body 5 having a flat upper surface 6. From the lower surface 7 depends a pair of L-shaped limbs 8 having transverse lips 9. Between the lips and the lower surface 7 are guide grooves 10 which provide a slideway.

The attaching plate 2 is adapted to be fixed permanently to an instrument or other device I. The plate may be provided with suitable openings (not shown) for the accommodation of mounting screws, or suitable clamps (not shown) may be used to clamp the device I to the attaching plate.

At the lower surface 7 of the body 5 is pivoted by pivot pins 11 a pair of latch levers or arms 12, each of which has a transversely extending spring arm 13. The arms confront and engage one another. Each lever 12 has a series of serrations or teeth 14. The levers 12 are swingable toward one another from the positions shown in FIG. 2, and in the directions of the arrows 15. Such movement is yieldably resisted by the arms 13, and the movement of the levers 12 toward one another is limited by stops 5a which depend from the lower surface of the body 5.

Each of the levers 12 also includes a spring finger 16 which projects beyond the pivoted end of the associated lever for a purpose presently to be explained.

The support 3 comprises a generally hemispherical body 18 having a smoothly rounded, convex, external surface 19. The body 18 also includes a substantially hemispherical socket 20 having a smoothly rounded surface 21 that is concentric with the surface 19. Accommodated in the socket 20 is a hemispherical retainer 22 having a seat 23 at one end thereof in communication with a bore 24. Extending between the surfaces 19 and 21 of the body 18 is a tapered opening 25 which converges upwardly.

That end of the body 18 which confronts the attaching member 2 (as viewed in FIG. 1) has a pair of upstanding legs 26 which terminate at their upper ends in feet 27 which, together with the legs 26, form a slide which interlocks with the lips 9 of the slideway on the body 5. The attaching member 2, therefore, is separably and interlockingly coupled by the slide and slideway to the support 3, but is capable of sliding movements back and forth relative to the support.

The inboard edges of the legs 26 are provided with serrations or teeth 28 which are adapted to mesh with the teeth 14 on the respective latch levers 12. The spring arms 13 bias the levers 12 toward the associated legs 26 so as normally to effect engagement of the teeth 14 and 28 with one another. However, the respective sets of teeth may be disengaged by movement of the levers 12 in the directions indicated by the arrows 15 in FIG. 2.

The support member 3 has a pair of upstanding abutments 29 which are so located as to abut the spring fingers 16 as shown in FIG. 2. The abutments 29 not only limit sliding movement of the attaching member 2 in one direction relative to the support 3, but also stress the spring fingers 16, thereby biasing the attaching member 2 in a direction away from the abutments 29 so as positively to engage the sets of teeth 14, 28 and prevent looseness or backlash therebetween.

The base 4 comprises an annular body 30 having an upstanding wall 31 provided at spaced intervals with apertured lugs 32 by means of which the base may be secured to a substructure 33 by bolts 34 or the like. The substructure may be the cowling of a boat, an overhead member, or any other suitable member. At its upper end the wall 31 has an inclined surface 35 to which is joined an upwardly concave web 36 having a spherical upper surface 37. The web 36 forms a socket for the accommodation of the support member 3. At substantially the center of the web 36 is a reinforcing boss 38 through which extends a bore 39 and a counterbore 40.

An anchor stud 41 has a head 42 seated in the counterbore 40 and a shank 43 which extends through the bore 39, the opening 25, and the bore 24. The shank 43 has a threaded free end 44 which extends through a correspondingly threaded nut 45 that is accommodated in the seat 23 of the retainer 22. The anchor stud 41 thus maintains the members 3 and 4 in assembled relation, but enables the support 3 to swivel through 360° relative to the base 4. Since the transverse dimension of the opening 25 is much greater than that of the stud shank 43, the support 3 can rock or tilt relative to the base 4 through a distance corresponding substantially to the width of the opening 25. Accordingly, even though the supporting sub-structure 33 may not be horizontal, as is shown in FIG. 1, the attaching member 2 may be positioned in a horizontal plane. The attaching member 2 and the support 3 also may be rotated as a unit relative to the base 4 so as to locate the device I in a desired circumferential position.

To facilitate rotation and tilting of the support 3 relative to the base 4, the distance between the stud head 42 and the nut 45 should be such that a clearance 46 may exist between the confronting concave-convex surfaces 19 and 37 of the members 3 and 4, thereby avoiding binding between the members 3 and 4. It thus is desirable to provide adjustable means for clamping the support 3 in a selected position of adjustment relative to the base. Accordingly, the preferred construction includes adjustable clamping means 47 comprising a split annulus or ring 48 of such diameter as to encircle the members 3 and 4 at their juncture. At opposite ends of the ring 48 are enlargements 49 and 50 each of which has a smooth bore 51 extending therethrough. An adjusting bolt 52 has a knurled head 53 at one end from which extends an enlarged section 54 of greater diameter than that of the bore 51 and which bears against the enlargement 49. Joined to the section 54 is a shank 55 which is threaded at its free end and extends through a correspondingly threaded nut 57 seated in a recess 58 in the enlargement 50. Rotation of the adjusting bolt 52 in one direction contracts the diameter of the ring 48, whereas rotation of the bolt in the opposite direction expands the diameter of the ring.

The inner surface of the ring 48 and the inner surfaces of the enlargements 49 and 50 have arcuate surfaces 59 at their upper edges which complement the curvature of the surface 19 of the support body 18. The ring 48 and the enlargements 49 and 50 have lower, inclined surfaces 60 which complement the surface 35 of the base 4. Thus, the inner surfaces of the ring 48 and the enlargements 49 and 50 are in the form of truncated wedges. As a consequence, contraction of the diameter of the ring 48 causes the support 3 to be moved in a direction away from the base 4 or upwardly, as shown in FIG. 1. Upward movement of the member 3 relative to the base 4 is limited by the stud head 42 and the retaining nut 45. The ring 48 thus will clamp both the support 3 and the base 4 sufficiently tightly to preclude inadvertent rotation or tilting of the support 3 relative to the base 4. However, when the diameter of the ring 48 is expanded, the member 3 once again may be rotated or tilted relative to the base 4.

Figure 3:
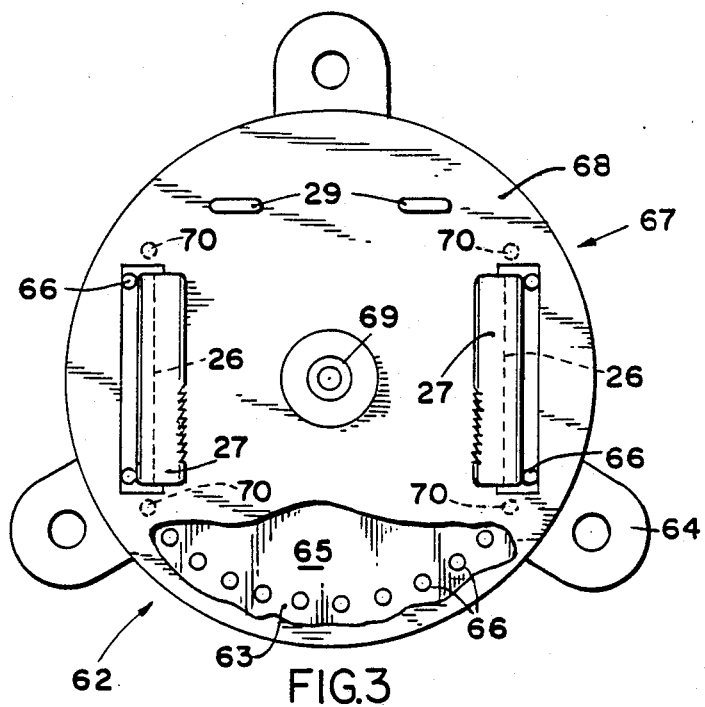
FIG. 3 is a fragmentary, top plan view of a second embodiment.

FIG. 3 discloses a modified embodiment wherein a flat base member 62 has a disk body 63 having mounting ears 64 like the ears 32 for the accommodation of mounting screws or bolts. The body 63 has a flat upper surface 65 provided with a plurality of circumferentially spaced indentations or dimples 66. A support disk 67 comprising a body 68 is pivoted by means of a post 69 to the body 63 for swiveling movement through 360°. The body 68 has a plurality, such as four, circumferentially spaced detent pins 70 which are movable into and out of the dimples 66 as the support body 68 rotates relative to the base 62, the body 68 being sufficiently flexible to enable such movements of the pins.

The upper surface of the support body 68 has slideway-forming legs 26 and feet 27 exactly like those of the embodiment shown in FIGS. 1 and 2, and it also has upstanding abutments 29 like the corresponding abutments described earlier.

The attaching member 2 shown in FIGS. 1 and 2 is adapted to be fitted to the support 67 in exactly the same way as described earlier. Accordingly, the attaching member 2 is not illustrated in FIG. 3.

The attaching member 2 and the device I supported thereon is adapted for removable mounting on the support 67 and such support is capable of rotation through 360°. The detent pins 70 cooperate with the dimples 66 and releasably maintain the support in any selected position of rotary adjustment relative to the base 62. However, the support 67 is not tiltable relative to the base.

Figure 4:
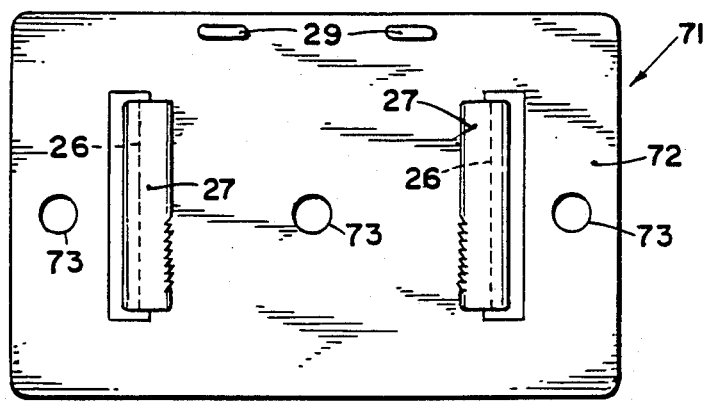
FIG. 4 is a top plan view of a further embodiment.

The embodiment shown in FIG. 4 comprises a support 71 having a body 72 provided with openings 73 or mounting ears for the accommodation of securing screws. The upper surface of the body 72 is flat except for slideway-forming members 26 and 27 and abutments 29 exactly like those described earlier. The attaching member 2 is adapted for removable coupling to the support 71 in the same manner as has been described earlier.

Although the attaching member 2 is removable from the support member 71, neither of the members 2 or 71 is tiltable or rotatable.

The devices disclosed herein are representative of preferred embodiments of the invention, but are intended to be illustrative rather than definitive thereof. The invention is defined in the claims.

I claim:

1. An article mounting device comprising an attachment member adapted for connection to said article; a support member; interlocking coupling means separably and slideably joining said attachment member and said support member; releasable latch means reacting between said members and releasably maintaining said members in assembled relation relative to one another, said latch means comprising a pair of levers pivoted at corresponding ends to one of said members for movements toward and away from latching engagement with the other of said members; and means biasing said levers toward said latching engagement.

2. The device according to claim 1 wherein said latch means comprises interengageable teeth.

3. The device according to claim 1 wherein said coupling means comprises a slideway on one of said members and a slide on the other of said members slideably accommodated in said slideway.

4. The device according to claim 3 including means biasing said attachment member to slide in one direction relative to said support member, said latch means being operable to overcome said biasing means.

5. The device according to claim 1 wherein said levers have teeth thereon and said other of said members has teeth thereon in a position to be engaged by the teeth on said levers.

6. The device according to claim 5 wherein said biasing means comprises a spring interposed between and acting on said pair of levers.

7. The device according to claim 1 including a base, said base and said support member having concave-convex confronting surfaces enabling rocking movements of said support member relative to said base, and releasable clamp means acting between said support member and said base for clamping said support member in a selected position of adjustment relative to said base.

8. The device according to claim 7 wherein said clamping means comprises an annulus encircling said support member and said base adjacent said confronting surfaces, and adjusting means for contracting and expanding said annulus.

9. The device according to claim 8 including anchor means reacting between said base and said support member for enabling said rocking movements but precluding separation of said members.

10. The device according to claim 9 wherein said anchor means comprises a stud fixed at one end to said base, said stud having a shank extending through an opening in said support member, said stud having its opposite end secured to a retainer having a spherical surface rotatably accommodated in a complementary socket formed in said support member.

11. The device according to claim 10 wherein said opening converges in a direction from said one end of said stud toward said opposite end thereof.

12. A mounting device comprising a base member; a support member, said members having confronting surfaces configured to enable said support member to rock and swivel relative to said base member; attaching means carried by said support member for attachment to an article to be mounted; anchor means secured to said members for maintaining said members in assembled relation with said surfaces confronting one another; and adjustable clamp means acting on said members for maintaining said members in a selected position of adjustment relative to one another, said clamp means comprising an annulus encircling and engaging both of said members, and adjusting means for contracting and expanding said annulus.

13. The device according to claim 12 wherein said anchor means comprises a stud secured at one end to said base member, and a spherical retainer rockably seated on said support member and secured to the opposite end of said stud.

14. The device according to claim 13 wherein said stud has a shank between its ends, said shank extending through an opening in said support member, said opening having a larger transverse dimension than that of said shank.

15. The device according to claim 14 wherein said opening converges in a direction from said one end of said stud toward said opposite end thereof.

16. The device according to claim 12 including means for removably securing said attaching means to said support member.

17. An article mounting device comprising a base; a support member; means mounting said support member on said base for rocking and swiveling movements relative to said base; means for clamping said support member in a selected position of adjustment relative to said base; an attaching member adapted for connection to said article; interlocking coupling means separably and slideably coupling said attaching member to said support member; releasable latch means releasably latching said attaching member to said support member; and means biasing said latch means toward its latched position.

18. The device according to claim 17 wherein said latch means comprises at least one lever carried by one of said members for movements into and out of latching engagement with said other of said members.

19. The device according to claim 18 wherein said lever and said other of said members have teeth engageable with one another.

20. The device according to claim 17 wherein said latch means comprises interengageable teeth.

21. The device according to claim 17 wherein said coupling means comprises a slideway on one of said members and a slide on the other of said members slideably accommodated in said slideway.

22. The device according to claim 21 including means for biasing said attaching member to slide in one direction relative to said support member, said latch means being operable to overcome said biasing means.

23. The device according to claim 17 wherein said latch means comprises a pair of levers pivoted at corresponding ends to one of said members for movements toward and away from latching engagement with the other of said members.

24. The device according to claim 23 wherein said biasing means comprises a spring interposed between and acting on said pair of levers.

25. An article mounting device comprising a support member; an attaching member adapted for connection to said article; interlocking means slideably and removably coupling said members to one another in assembled relation; releasable latch means for releasably latching said members in said assembled relation; means mounting said latch means on one of said members for movements into and out of latching engagement with the other of said members; and yieldable means biasing said latch means toward said latching engagement.

26. An article mounting device according to claim 25 including a base member; means mounting said support member on said base member for swiveling movements; and means reacting between said base member and said support member for maintaining the latter in a selected position of swiveled adjustment, 27. An article mounting device according to claim 25 including a base member, means mounting said support member on said base member for rocking movements relative thereto; and clamp means reacting between said base member and said support member for maintaining the latter in a selected position of rocked adjustment.

* * * * *